US010099351B2

(12) United States Patent
McGougan

(10) Patent No.: US 10,099,351 B2
(45) Date of Patent: Oct. 16, 2018

(54) TORQUE DELIVERING POWER TOOL WITH FLYWHEEL

(71) Applicant: ATLAS COPCO INDUSTRIAL TECHNIQUE AB, Stockholm (SE)

(72) Inventor: Robin McGougan, Enskede (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 453 days.

(21) Appl. No.: 14/910,784

(22) PCT Filed: Jun. 19, 2014

(86) PCT No.: PCT/EP2014/062911

§ 371 (c)(1),
(2) Date: Feb. 8, 2016

(87) PCT Pub. No.: WO2015/018556

PCT Pub. Date: Feb. 12, 2015

(65) Prior Publication Data

US 2016/0199970 A1 Jul. 14, 2016

(30) Foreign Application Priority Data

Aug. 8, 2013 (SE) .................................... 13500945

(51) Int. Cl.
*E21B 3/00* (2006.01)
*E21B 17/22* (2006.01)
(Continued)

(52) U.S. Cl.
CPC .............. *B25B 21/00* (2013.01); *B25F 5/001* (2013.01)

(58) Field of Classification Search
CPC .. B25F 5/02; B25F 5/006; B25F 5/001; B25B 21/00
(Continued)

(56) References Cited

U.S. PATENT DOCUMENTS 2,712,254 A * 7/1955 Schodeberg .......... B25B 21/007 173/93.6
3,703,933 A 11/1972 Schoeps
(Continued)

FOREIGN PATENT DOCUMENTS

DE 3331356 A1 3/1985
EP 1182010 A1 2/2002
(Continued)

OTHER PUBLICATIONS

International Search Report (ISR) dated Nov. 11, 2014 issued in International Application No. PCT/EP2014/062911.
(Continued)

*Primary Examiner* — Robert Long
(74) *Attorney, Agent, or Firm* — Holtz, Holtz & Volek PC

(57) ABSTRACT

A hand held power tool, for delivering a torque to a joint, includes a housing that houses a motor arranged to drive an input shaft; an output shaft arranged to provide a torque to the joint; and a planetary gear connecting the input shaft to the output shaft. A flywheel is arranged to rotate freely with respect to the housing. A cam block, loosely fitted inside the housing, is rotatively connected to a part of the planetary gear and connected to the housing via a cam profile, wherein an interaction between the cam block and the cam profile will force the cam block into contact with the flywheel when the cam block is rotated. Thus, any counterforces acting on the output shaft will be provided to the flywheel via the planetary gear, such that the operator will not need to provide any counterforces.

14 Claims, 3 Drawing Sheets

(51) Int. Cl.
*E21B 19/16* (2006.01)
*E21B 19/18* (2006.01)
*B25B 21/00* (2006.01)
*B25F 5/00* (2006.01)

(58) Field of Classification Search
USPC .......................... 173/2, 90, 93, 176–178, 216
See application file for complete search history.

(56) References Cited

U.S. PATENT DOCUMENTS

| | | | | |
|---|---|---|---|---|
| 4,462,345 | A * | 7/1984 | Routery | F01B 3/04 123/197.4 |
| 5,158,354 | A | 10/1992 | Simonin | |
| 5,673,758 | A * | 10/1997 | Sasaki | B25B 21/02 173/178 |
| 5,848,655 | A | 12/1998 | Cooper et al. | |
| 5,970,824 | A | 10/1999 | Thompson et al. | |
| 6,883,617 | B2 * | 4/2005 | Putney | B25B 23/1453 173/1 |
| 7,311,027 | B1 | 12/2007 | Tatsuno | |
| 9,314,908 | B2 * | 4/2016 | Tanimoto | B25B 21/02 |
| 2005/0199404 | A1 * | 9/2005 | Furuta | B25B 21/00 173/48 |
| 2006/0090913 | A1 * | 5/2006 | Furuta | B25B 21/00 173/48 |
| 2006/0237205 | A1 * | 10/2006 | Sia | B25B 21/00 173/48 |
| 2007/0012466 | A1 * | 1/2007 | Sell | B25D 11/108 173/48 |
| 2007/0181319 | A1 * | 8/2007 | Whitmine | B25B 21/00 173/48 |
| 2009/0056966 | A1 * | 3/2009 | Grand | B25B 21/02 173/93.5 |
| 2010/0071923 | A1 * | 3/2010 | Rudolph | B25B 21/00 173/48 |
| 2010/0319945 | A1 * | 12/2010 | Chen | B23B 45/008 173/48 |
| 2011/0036605 | A1 * | 2/2011 | Leong | B25B 21/00 173/47 |
| 2011/0232930 | A1 * | 9/2011 | Zhang | B25F 5/001 173/178 |
| 2012/0318550 | A1 * | 12/2012 | Tanimoto | B25B 23/1405 173/117 |
| 2013/0126202 | A1 * | 5/2013 | Oomori | B25B 21/00 173/217 |
| 2014/0158390 | A1 * | 6/2014 | Mashiko | B25B 21/00 173/47 |
| 2016/0184983 | A1 * | 6/2016 | McGougan | B25F 5/001 173/216 |
| 2017/0129092 | A1 * | 5/2017 | Kimura | B25F 5/001 |

FOREIGN PATENT DOCUMENTS

| | | | |
|---|---|---|---|
| EP | 1930123 | A1 | 6/2008 |
| FR | 2777216 | A1 | 10/1999 |

OTHER PUBLICATIONS

Related U.S. Appl. No. 14/910,818; First Named Inventor: Robin McGougan; Title: "Power Tool With Flywheel and Gear for Accelerating Said Flywheel"; filed Feb. 8, 2016.

* cited by examiner

TORQUE DELIVERING POWER TOOL WITH FLYWHEEL

The invention relates to a hand held power tool for delivering a torque in order to tighten joints. Specifically, the invention relates to a hand held power tool with a flywheel that is adapted to reduce the reaction forces sensed by an operator handling the tool.

BACKGROUND

A hand held torque delivering power tool such as a nut runner needs to fulfil a number of criteria in order to make it efficient and agreeable to use for an operator. Firstly, it should be adapted to provide a sufficiently high torque to tighten a predetermined type of joints and it should be adapted to tighten said joints to a specific desired torque and/or clamp force.

Further, in order for the power tool to be agreeable to use for an operator, the magnitude of the reaction forces that has to be counteracted by the operator should be kept as low as possible.

The reaction forces are produced as the screw or nut is being tightened and the clamp force in the joint is produced. A nut tightening operation generally includes two phases, a first phase during which the screw is threaded into the joint and a second phase in which the screw is tightened and the clamp force in the joint is being produced. The point in time where the threading phase passes into the tightening phase is generally denoted as “snug”. It is only after snug, i.e. during the tightening phase that reaction forces will be created in the power tool. The reaction forces are created in response to the increasing torque needed to tighten the joint by rotation of the screw.

A problem that needs to be addressed in most types of hand held torque delivering power tools is to keep the counter forces as low as possible, even when a considerable torque is applied to the joint.

A solution to the above problem is presented in the patent specification U.S. Pat. No. 7,311,027 B1. In the power tool described in this specification a bit holder is driven to rotate in a first direction by means of a first motor and a flywheel is driven to rotate in the opposite direction by means of a second motor. A brake is arranged to decelerate the flywheel in response to the reaction force that are transmitted from the joint to the power tool. With an increasing reaction force, an increasing deceleration of the flywheel is achieved to compensate said increasing reaction force, such that the overall reaction force experienced by the operator will be as low as possible. A disadvantage of this arrangement is e.g. that a second motor is needed to drive the flywheel and that energy is wasted in the process.

SUMMARY OF THE INVENTION

An object of the invention is to provide a power tool in which the reaction forces that will be transmitted to the operator will be kept as low as possible, while at the same time providing a sufficient torque to tighten torque demanding joints. This object is achieved by the invention according to claim 1.

According to a first aspect the invention relates to a hand held power tool for delivering a torque to a joint, which power tool comprises a housing that houses: a motor arranged to drive an input shaft; an output shaft arranged to provide a torque to the joint; and a planetary gear connecting said input shaft to said output shaft, the planetary gear comprising a sun wheel and a rim gear, and at least one planet wheel arranged between the sun wheel and the rim gear, wherein the at least one planet wheel is arranged on a planet wheel carrier; and wherein the input shaft is connected to said sun wheel for driving said output shaft via said planetary gear, the output shaft being connected to said planet wheel carrier. A flywheel is arranged to rotate freely with respect to the housing, which flywheel may bet set to rotate. A cam block is loosely fitted inside the housing, which cam block is rotatively connected to the rim gear and connected to the housing via an interaction between a cam profile and a cam follower, wherein said cam profile is inclined such that the interaction between the cam follower and the cam profile will provide an axial movement to the cam block when it is rotated with respect to the housing, such that the cam block will be forced into contact with the flywheel as a result of said rotation.

According to a second aspect the invention relates to a similar hand held power tool, but in which the rim gear is connected to the output shaft, and in which the planet carrier is connected to the cam block.

An advantage of the invention according to both aspects is that the elimination of the reaction forces will be self-regulating. The higher the reaction forces will be on the output shaft, the closer the contact will be between the flywheel and interconnected part of the planetary gear. Hence, the operator will have no or very low counterforce to balance up, and the energy stored in the flywheel will only be used if there are any counterforces that need to be balanced.

In a specific embodiment of the invention the flywheel may be set to rotate in both directions, wherein the cam profile is inclined in both directions from an initial position, such that rotation in either direction of the cam block from said initial position will push the cam block axially towards contact with the flywheel.

In this specific embodiment the flywheel may be arranged to assist both in tightening and loosening operations.

In another embodiment of the invention the flywheel may be set to rotate by means of the motor. Thereby, no additional motor is needed Specifically, a selection gear may be arranged by means of which the motor may be selectively connected to either the input shaft or the flywheel.

In one specific embodiment of the invention the interaction between the cam follower and the cam profile comprises at least three cam followers that are arranged to bear against at least three corresponding cam profiles on the inside of the housing.

With the use of at least three cam followers and least three corresponding cam profiles the cam block will be axially aligned at all times.

In a another embodiment of the invention the cam profiles include a recess arranged to receive the cam followers when the cam block is in an initial position where it is not in contact with the flywheel, and wherein a certain threshold torque is needed to move the cam followers out of the recesses.

The interaction between the recesses and the cam followers will imply that a certain threshold torque will have to be exceeded before the cam block rotates out of its initial position and into contact with the flywheel.

In a specific embodiment of the invention the cam profile is arranged on the inside of the housing, and the cam follower is arranged on the cam block. In another embodiment the cam follower is arranged on the inside of the housing, and the cam profile is arranged on the outside of the cam block.

Specific embodiments and other advantages of the invention will be apparent from the detailed description.

SHORT DESCRIPTION OF THE DRAWINGS

In the following detailed description reference is made to the accompanying drawings, of which:

Figure 3:
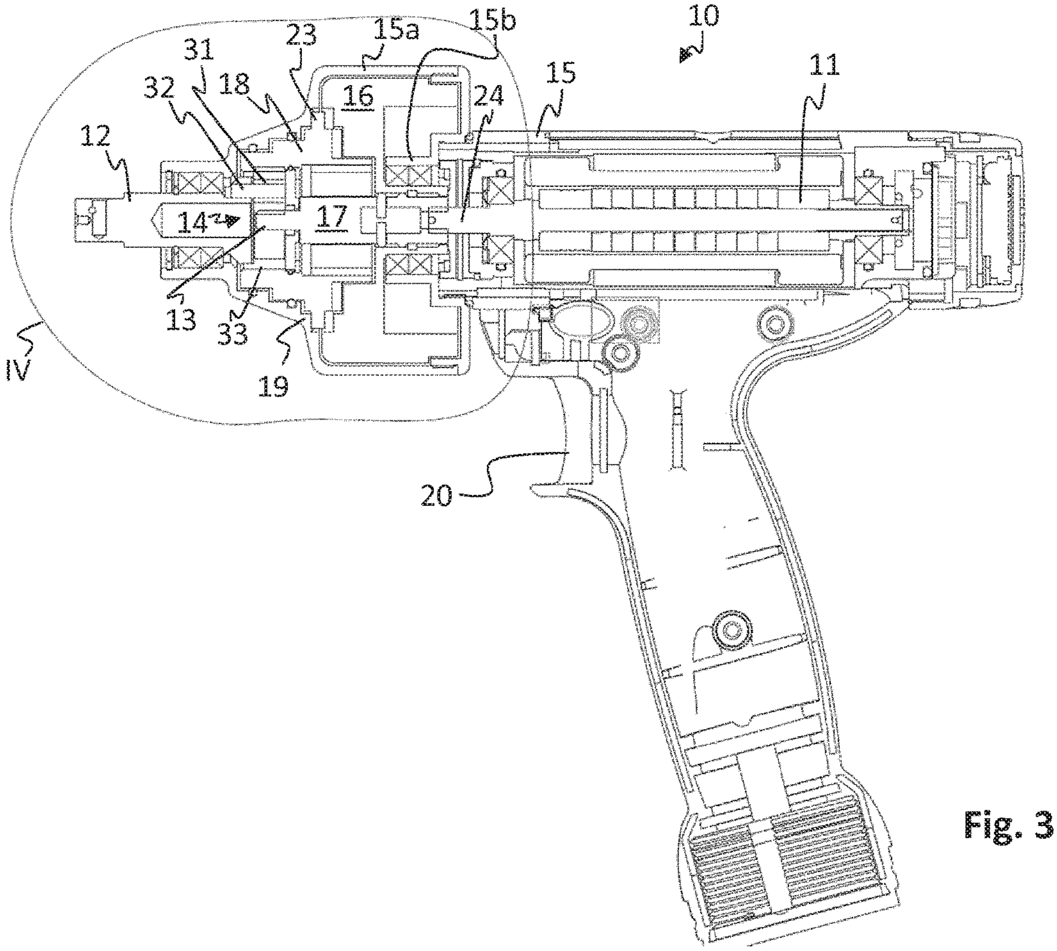
FIG. 3 shows a view of a specific embodiment of the invention.
Figure 4A:
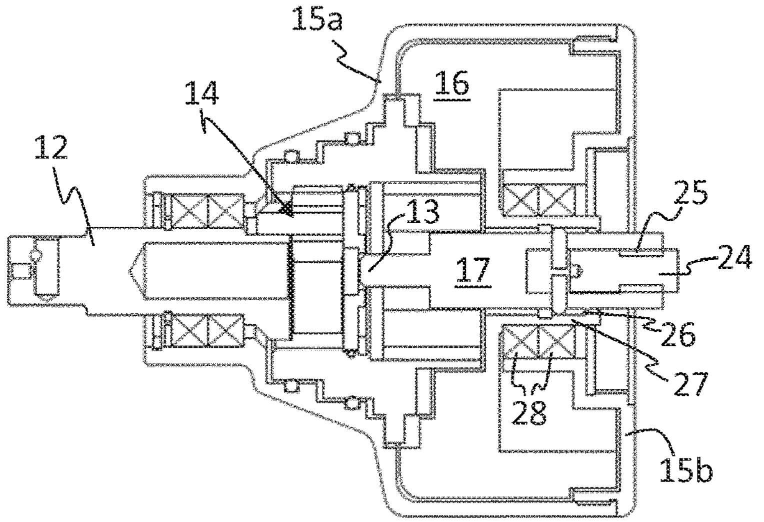
Figure 4B:
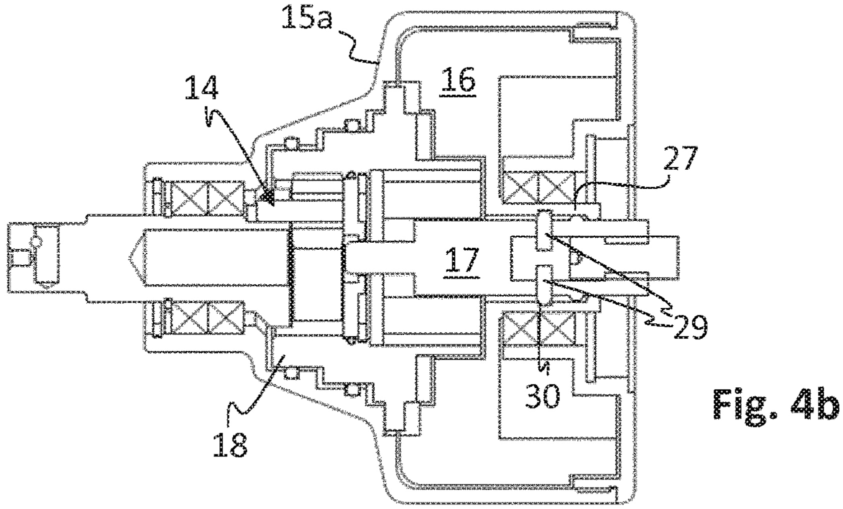
Figure 4C:
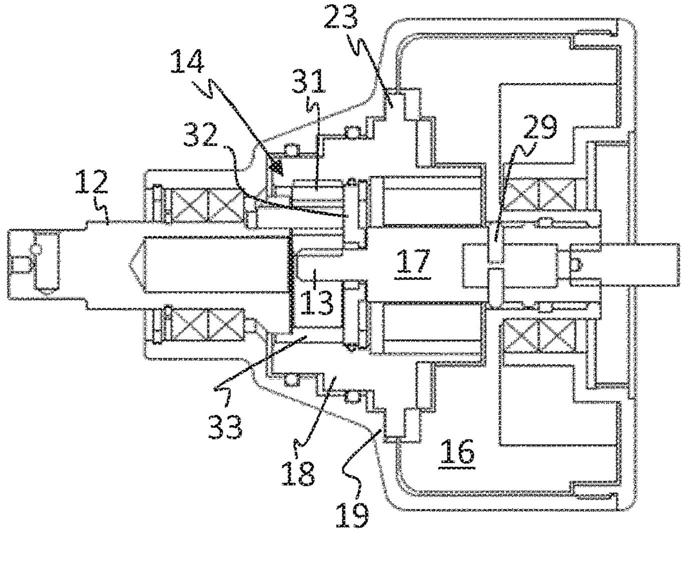
Figure 5:
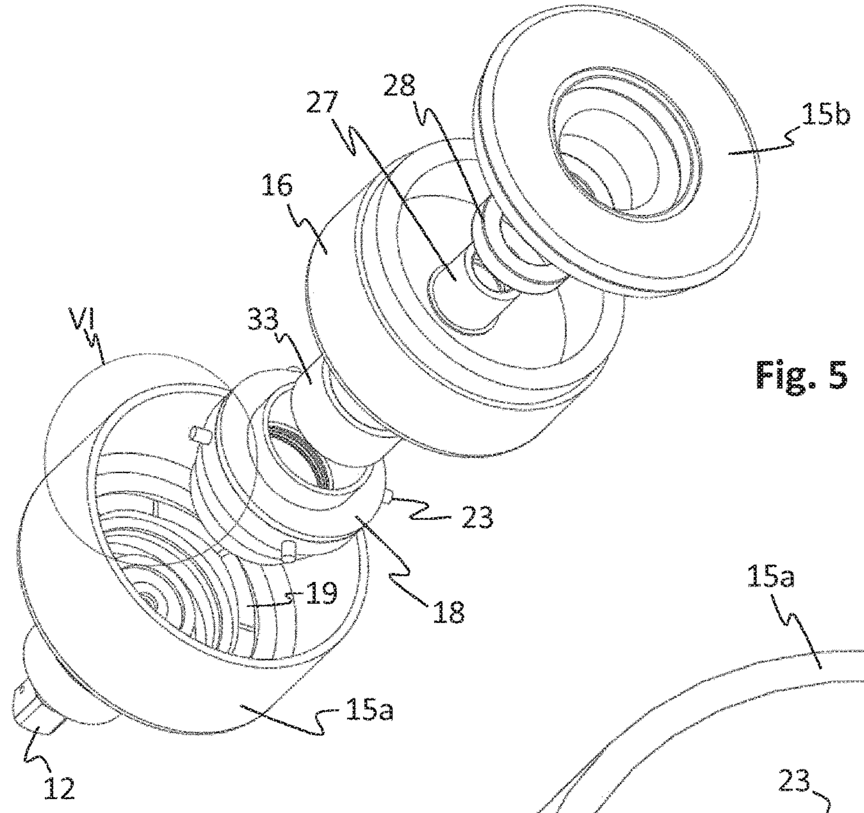
Figure 6:
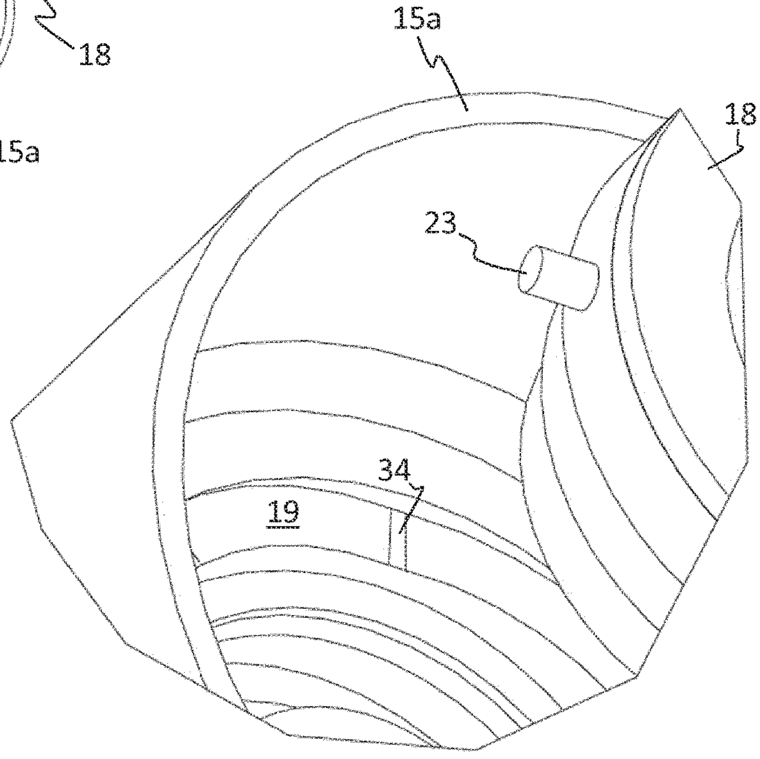

FIG. 4*a-c* show detailed views of section IV of FIG. 3 in three different modes;

FIG. 5 shows an exploded view of a front part of the embodiment shown in FIG. 3;

FIG. 6 shows a detailed view of section VI of FIG. 5.

DETAILED DESCRIPTION OF THE SHOWN EMBODIMENTS OF THE INVENTION

Figure 1:
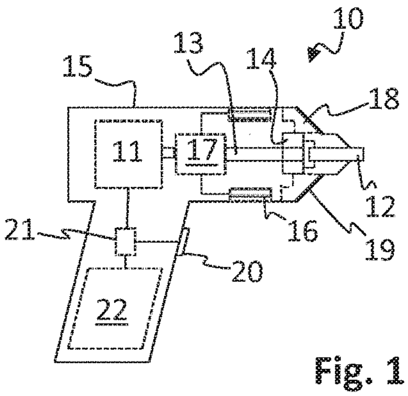
FIG. 1 shows a view of a general embodiment of the invention in a first operation mode.
Figure 2:
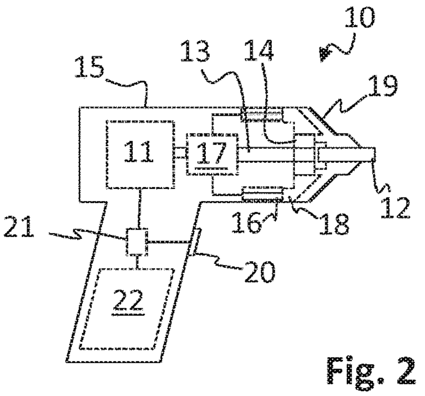
FIG. 2 shows the embodiment of FIG. 1 in a second operation mode.

In FIGS. 1 and 2 the invention is schematically shown in a general manner. The invention relates to a power tool 10 with a housing 15, inside which a motor 11 is arranged to drive an input shaft 13 that is connected to an output shaft 12 via a planetary gear 14. A cam profile 19 is arranged inside the housing 15, preferably the front part of the housing. The cam profile 19 is arranged to interact with a cam block 18 that is rotatably arranged in said housing. The interaction of the cam block 18 and the cam profile 19 is such that when the cam block 18 is rotated, in either direction, it will follow the cam profile 19 and be axially translated.

The planetary gear 14 comprises a sun wheel located centrally in the gear, at least one planet wheel and an outer gear rim that is in meshing contact with the at least one planet wheel. In a specific embodiment of the invention the planetary gear comprises three planet wheels which are interconnected by a planet wheel carrier.

The output shaft 12 may be connected to either the gear rim or the planet wheel carrier. If the output shaft 12 is connected to the planet wheel carrier the gear rim will be connected to the cam block 18 such that it may be rotated along with said cam block. If, on the other hand, the output shaft 12 is connected to the gear rim the planet wheel carrier will be connected to the cam block 18.

Further, the inventive power tool includes a flywheel 16, which may be set to rotate freely with respect to the housing 15. Also, a selection gear 17 is arranged, which may be set to connect the motor 11 to the flywheel 16. The power tool 10 comprises a trigger 20 which is connected to a control unit 21. The power tool may further comprise a power unit 22 such as a battery housed inside the housing and/or a connection to an external power unit. When the trigger 20 is pressed energy is provided from the power unit 22 to the motor 11 which will drive the output shaft 12 via the input shaft 13 and the planetary gear 14. As a first step the selection gear 17 will however be connected to the flywheel 16 so as to get the flywheel 16 to rotate at full speed.

As the flywheel 16 has been set to rotate the selection gear 17 will be connected to the input shaft 13 so as to drive the output shaft via the planetary gear 14. Now, for as long as the output shaft 12 may be driven at a low torque, e.g. for as long as no clamp force is produced in the joint, the cam block 18 will not rotate. In a specific embodiment a resilient element is arranged to keep the cam block 18 and the interconnected part of the planetary gear 14 from rotating.

As soon as the torque increases over a specific threshold value $T_{Threshold}$ the counter forces will be transmitted from the output shaft 12 and to the interconnected part of the planetary gear 14 and the cam block 18, such that the cam block 18 will start to rotate counter clockwise. The interaction between the cam block 18 and the cam profile 19 will force the cam block 18 backwards and into contact with a contact surface of the flywheel 16. This contact will constitute a friction coupling between the cam block 18 and the flywheel 16, in which kinetic energy will be transmitted from the flywheel 16 to the cam block 18. Thereby the cam block 18 will be pushed axially forward by the interaction with the flywheel 16.

In a typical tightening operation the torque increases continuously, after a certain point, towards a final point where a desired torque $T_{target}$ is reached. In such an operation the cam block 18 will be in continuous contact with the flywheel 16 during the final phases of the tightening. In this operation the counterforces will not be transmitted to the housing, as they would have been in a conventional power tool. Instead, the counterforces will be taken up by the flywheel 16, which will be retarded throughout the final phases of the tightening. Hence, there will be no or very low torques to be counteracted for the operator holding the tool.

A specific embodiment of the invention is shown in FIG. 3. The features shown in FIG. 3 have the same reference numerals as the corresponding features in FIGS. 1 and 2. It is to be noted that in the specific embodiment shown in FIG. 3 the selection gear 17 is an axially translatable gear pin that is driven by a motor shaft 24 at a first end and that is connected to the planetary gear 14 in the opposite end. Specifically, the front end of the selection gear 17 is constituted by the input shaft 13. In FIG. 3, the housing 15 comprises a front housing part 15*a* and an inner housing part 15*b*.

As illustrated in FIG. 3 the input shaft 13 constitutes a sun wheel of the planetary gear 14. The sun wheel drives the planet wheels 31, which are interconnected by a planet wheel carrier 32. The planet wheel carrier 32 is connected to the output shaft 12. Hence, when the sun wheel is driven to rotate clockwise the planet wheels 31 will rotate counter clockwise around their own axes whereby the planet wheel carrier 32 wheel rotate clockwise at a lower speed than the sun wheel. The outer gear rim 33 is connected to the cam block 18 that is rotatably arranged inside the front housing part 15*a*.

The flywheel 16 is set to rotate in the same direction as the output shaft 12 is to be rotated. Hence, when a conventional joint is to be tightened the flywheel 16 is set to rotate clockwise. The gear rim 33 and the cam block will not rotate for as long as the counterforces acting on the output shaft 12 are below a certain threshold torque $T_{Threshold}$.

The cam block 18 shown in FIG. 3 includes at least one cam follower in the form of a pin 23, which is arranged to interact with a cam profile 19 in the interior of the front housing part 15*a*. The function of the specific embodiment shown in FIG. 3 will be explained below, with reference to FIGS. 4*a*-4*c*, in which a detailed view of the front part of the tool 10 is shown in three different modes.

In FIG. 4*a* the tool is shown in a flywheel accelerating mode, in FIG. 4*b* the tool is shown in an intermediate mode, and in FIG. 4*c* the tool is shown in a production mode. In the different modes the selection gear 17 is positioned in different positions.

In the flywheel accelerating mode shown in FIG. 4*a* the selection gear 17 is positioned so as to connect the motor shaft 24 to the flywheel 16. The flywheel accelerating mode is used as a first step of a tightening operation in order to make sure that the flywheel 16 is rotating before the joint is tightened. The motor shaft 24 is connected to the selection gear 17 via a splined coupling 25 that allows the selection gear 17 to be axially translated with respect to the tool housing 15. The selection gear 17 comprises outer splines 26 that interact with an inner portion 27 of the flywheel 16. The flywheel 16 is carried in bearings 28 with respect to the inner housing part 15*b*. The front part of the selection gear 17 that forms the input shaft 13 is not in gear with the planetary gear 14.

The selection gear 17 is such arranged that it may be axially translated and its position may be controlled by means of a solenoid (not shown). When the flywheel 16 has been accelerated by the motor to a desired rotational speed the selection gear 17 is axially translated to the intermediate mode, shown in FIG. 4*b*. In the intermediate mode the selection gear 17 is not in gearing contact with neither the inner portion 27 of the flywheel 16 nor with the planetary gear 14.

The selection gear 17 comprises radial pins 29, which extend radially from the surface of the selection gear 17 when it rotates above a certain rpm. When the selection gear 17 is axially translated from the interaction with the flywheel 16 it rotates at the same rpm as the flywheel 16 such that the radial pins 29 will extend out of their respective holes and into contact with the surrounding inner surface of the inner portion 27 of the flywheel 16. As the selection gear 17 is axially translated from the interaction with the flywheel 16 the radial pins 29 will extend into openings 30 in the inner surface of the inner portion 27 of the flywheel 16. The interaction between the radial pins 29 and the openings 30 will obstruct the selection gear 17 from further axial translation until its rotational speed reaches below a threshold speed at which the radial pins 29 will be retracted into the selection gear 17 and out of the openings 30, such that the selection gear 17 may be dislocated from the position corresponding to the intermediate mode. The retraction may be achieved in that the radial pins 29 have a rounded edge that will interact with the edge of the openings 30. At a certain point when the rotational speed reaches below a specific threshold speed the action of the solenoid will overcome the centrifugal force that pushes the radial pins 29 outwards. At this point the selection gear 17 will be dislocated from the position corresponding to the intermediate mode.

In order to accelerate the output shaft 12 the selection gear 17 will need to be moved into a production mode, in which it connects the motor 11 to the output shaft 12, via the planetary gear 14. In FIG. 4*c* the selection gear 17 is shown in the production mode. In this mode the input shaft 13 will act as the sun wheel of the planetary gear 14. The input shaft 13 will hence drive the rotation of a number of planet wheels 31. In practice only one planet wheel is needed, but preferably at least three planet wheels are used. The planet wheels 31 are interconnected by means of a planet wheel carrier 32, which in turn is connected to the output shaft 12. A gear rim 33 is arranged in gearing connection with the planet wheels 31 outside said wheels.

As the sun wheel, i.e. the input shaft 13, is rotated clockwise the planet wheels 31 will be set to rotate counter clockwise around their own axes. The planet wheel carrier 32 will thereby be set to rotate clockwise at a rotational speed that is about 3-5 times lower than that of the input shaft 13.

As the planet wheel carrier 32 is connected to the output shaft 12, the output shaft 12 will rotate at the same rotational speed as the planet wheel carrier 32.

The gear rim 33 is connected to the cam block 18. For as long as the output shaft 12 may be driven without substantially effort the gear rim 33 and the cam block 18 will not rotate. As soon as the counter forces acting on the output shaft 12 reaches over a specific threshold value $T_{Threshold}$, e.g. when a clamp force is produced a joint that is tightened, the gear rim 33 and the cam block 18 will be set to rotate counter clockwise. The interaction of the at least one cam follower 23 that follows the cam profile 19 will force the cam block 18 axially backwards towards the flywheel 16, which will provide a force that will act clockwise on the cam block 18.

In the shown embodiment the cam follower 23 is a part of the cam block, and the cam profile 19 is arranged on the inside of the housing 15. It may however, just as well, be that other way around, i.e. that the cam profile 19 is arranged on the outside of the cam block, and the cam follower 23 extends from the inside of the housing 15. The function would be the same.

FIG. 5 shows an exploded view of the cam block 18 and the flywheel 16. From right in the figure an inner housing part 15*b* and the flywheel 16 are shown. A bearing 28 that connects the inner part of the flywheel 16 to the inner housing part 15*b* is located between them. The gear rim 33 of the planetary gear fits tightly inside the cam block 18. On the far left the front housing part 15*a* and the output shaft 12 are visible. The cam block 18 includes four cam followers 23 in the form of pins that interact with four corresponding cam profiles 19 in the interior of the front housing part 15*a*. The interaction between the cam block 18 and the cam profile 19 will be described with reference to FIG. 6, in which the encircled portion VI of FIG. 5 is shown in detail.

The cam profile 19 includes recesses 34, in which the cam followers 23 of the cam block 18 is located when the cam block 18 is in its initial position. When the cam block 18 is in the initial position it will not be in contact with the flywheel. The interaction between the cam followers 23 and the recesses 34 will restrict the rotation of the cam block 18 and make sure that it will stay put as long as it is subjected to low torques. When the torque acting on the cam block 18 reaches over a given threshold value $T_{Threshold}$ the cam block will be rotated such that the cam followers 23 will move out from the recess 34 resulting in that the cam block 18 will be axially translated backwards towards the flywheel 16. As is clearly visible in FIG. 6 the cam profile 19 is continuously inclined such that further rotational movement of the cam block 18, in either direction, will bring the cam block 18 further backwards towards a closer contact with the flywheel 16. The shown embodiment provides a function that implies that equilibrium may be found, in which so much energy that is needed in every instant is provided from the flywheel 16 to the cam block 18 and the interconnected gear rim 33.

Above, the invention has been described with reference to specific embodiments. The invention is however no limited to these embodiments. A skilled person will be able to find different alternatives to the different features of the specific embodiments, which lie within the scope of the invention, which is only limited by the following claims.

The invention claimed is:

1. A hand held power tool, for delivering a torque to a joint, the power tool comprises a housing that houses:

a motor arranged to drive an input shaft;

an output shaft arranged to provide a torque to the joint; and a planetary gear connecting said input shaft to said output shaft, the planetary gear comprising a sun wheel and a rim gear, and at least one planet wheel arranged between the sun wheel and the rim gear, the at least one planet wheel being arranged on a planet wheel carrier; wherein the input shaft is connected to said sun wheel for driving said output shaft via said planetary gear, the output shaft being connected to said planet wheel carrier;

wherein a flywheel, which is arranged to rotate freely with respect to the housing, may be set to rotate; and in that a cam block, which is loosely fitted inside the housing, is rotatively connected to the rim gear and connected to the housing via an interaction between a cam profile and a cam follower, wherein said cam profile is inclined such that the interaction between the cam profile and the cam follower will provide an axial movement to the cam block when it is rotated with respect to the housing, such that the cam block will be forced into contact with the flywheel as a result of said rotation.

2. A hand held power tool, for delivering a torque to a joint, the power tool comprises a housing that houses:

a motor arranged to drive an input shaft;

an output shaft arranged to provide a torque to the joint; and a planetary gear connecting said input shaft to said output shaft, the planetary gear comprising a sun wheel and a rim gear, and at least one planet wheel arranged between the sun wheel and the rim gear, the at least one planet wheel being arranged on a planet wheel carrier; wherein the input shaft is connected to said sun wheel for driving said output shaft via said planetary gear, the output shaft being connected to said rim gear;

wherein a flywheel, which is arranged to rotate freely with respect to the housing, may be set to rotate; and in that a cam block, which is loosely fitted inside the housing, is rotatively connected to the rim gear and connected to the housing via an interaction between a cam profile and a cam follower, wherein said cam profile is inclined such that the interaction between the cam profile and the cam follower will provide an axial movement to the cam block when it is rotated with respect to the housing, such that the cam block will be forced into contact with the flywheel as a result of said rotation.

3. The hand held power tool according to claim 1, wherein the flywheel may be set to rotate in both directions, and wherein the cam profile is inclined in both directions from an initial position, such that rotation in either direction of the cam block from said initial position will push the cam block axially towards contact with the flywheel.

4. The hand held power tool according to claim 1, wherein the flywheel may be set to rotate by means of the motor.

5. The hand held power tool according to claim 4, wherein a selection gear is arranged by which the motor may be selectively connected to either the input shaft or to the flywheel.

6. The hand held power tool according to claim 1, wherein the interaction between the cam profile and the cam follower comprises at least three cam followers that are arranged to bear against at least three corresponding cam profiles.

7. The hand held power tool according to claim 6, wherein the at least three cam profiles include recesses arranged to receive the at least three cam followers when the cam block is in an initial position where it is not in contact with the flywheel, and wherein a certain threshold torque is needed to move the at least three cam followers out of the recesses.

8. The hand held power tool according to claim 1, wherein the cam profile is arranged on the inside of the housing, and wherein the cam follower is arranged on the cam block.

9. The hand held power tool according to claim 2, wherein the flywheel may be set to rotate in both directions, and wherein the cam profile is inclined in both directions from an initial position, such that rotation in either direction of the cam block from said initial position will push the cam block axially towards contact with the flywheel.

10. The hand held power tool according to claim 2, wherein the flywheel may be set to rotate by means of the motor.

11. The hand held power tool according to claim 10, wherein a selection gear is arranged by which the motor may be selectively connected to either the input shaft or to the flywheel.

12. The hand held power tool according to claim 2, wherein the interaction between the cam profile and the cam follower comprises at least three cam followers that are arranged to bear against at least three corresponding cam profiles.

13. The hand held power tool according to claim 12, wherein the at least three cam profiles include recesses arranged to receive the at least three cam followers when the cam block is in an initial position where it is not in contact with the flywheel, and wherein a certain threshold torque is needed to move the at least three cam followers out of the recesses.

14. The hand held power tool according to claim 2, wherein the cam profile is arranged on the inside of the housing, and wherein the cam follower is arranged on the cam block.

* * * * *